US009495327B2

(12) United States Patent
Deng et al.

(10) Patent No.: US 9,495,327 B2
(45) Date of Patent: Nov. 15, 2016

(54) SERVICE CONFIGURATION METHOD, DEVICE AND SYSTEM

(71) Applicant: Huawei Technologies Co., Ltd., Shenzhen, Guangdong (CN)

(72) Inventors: Fuyuan Deng, Shenzhen (CN); Yiming Wang, Ipswich (GB); Chaohui Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 824 days.

(21) Appl. No.: 13/706,134

(22) Filed: Dec. 5, 2012

(65) Prior Publication Data
US 2013/0097294 A1    Apr. 18, 2013

Related U.S. Application Data

(63) Continuation of application No. PCT/CN2010/073594, filed on Jun. 7, 2010.

(51) Int. Cl.
G06F 15/177 (2006.01)
H04L 12/46 (2006.01)
H04L 29/12 (2006.01)

(52) U.S. Cl.
CPC ......... *G06F 15/177* (2013.01); *H04L 12/4679* (2013.01); *H04L 61/2015* (2013.01)

(58) Field of Classification Search
CPC .............. H04L 29/06; H04L 29/08981; H04L 29/08072; H04L 41/082; H04L 12/4679; G06F 8/65
USPC ......................................... 709/221; 370/389
See application file for complete search history.

(56) References Cited

U.S. PATENT DOCUMENTS 6,539,019 B1 * 3/2003 Noy ..................... H04L 12/5601
                                                       370/395.53
6,680,945 B1 * 1/2004 Merchant ............ H04L 12/4645
                                                       370/395.1

(Continued)

FOREIGN PATENT DOCUMENTS

CN          1416239 A        5/2003
CN          1437360 A        8/2003

(Continued)

OTHER PUBLICATIONS

Written Opinion of the International Searching Authority dated Mar. 17, 2011 in connection with International Patent Application No. PCT/CN2010/073594.

(Continued)

*Primary Examiner* — Imad Hussain

(57) ABSTRACT

The present invention discloses a service configuration method, apparatus and system. The provided method includes steps as follows: configuring a VLAN ID of a port on an intermediate device according to preset configuration information, where the port is connected to a client; after a DHCP request message which is from the client through the intermediate device is received, obtaining a MAC address in the DHCP request message, and obtaining an IP address corresponding to the MAC address from the configuration information; and sending a response message carrying the IP address and the VLAN ID to the client through the intermediate device, so that the client sets a local virtual local area network identifier to the VLAN ID and sets a local IP address to the IP address after receiving the response message.

11 Claims, 4 Drawing Sheets

(56) References Cited

U.S. PATENT DOCUMENTS

| | | | | |
|---|---|---|---|---|
| 7,385,973 | B1* | 6/2008 | Johnson | H04L 12/4675 370/389 |
| 7,836,203 | B2* | 11/2010 | Tolliver | H04L 41/0806 709/220 |
| 2004/0199644 | A1* | 10/2004 | Gass | H04L 12/4675 709/227 |
| 2005/0044271 | A1* | 2/2005 | Bastide | H04L 12/4645 709/245 |
| 2006/0155853 | A1* | 7/2006 | Nesz | H04L 61/2015 709/227 |
| 2007/0268917 | A1* | 11/2007 | Wong | G06F 9/4416 370/401 |
| 2008/0089323 | A1* | 4/2008 | Elias | H04L 61/2084 370/389 |
| 2008/0172492 | A1* | 7/2008 | Raghunath | H04L 12/467 709/229 |
| 2008/0294755 | A1* | 11/2008 | Melsen | H04L 12/2898 709/220 |
| 2009/0010249 | A1* | 1/2009 | Gass | H04L 61/2015 370/352 |
| 2009/0169207 | A1* | 7/2009 | Absillis | H04L 12/4641 398/58 |
| 2009/0193103 | A1* | 7/2009 | Small | H04L 12/462 709/221 |
| 2009/0217350 | A1* | 8/2009 | Manning | H04L 61/2015 726/3 |
| 2009/0304008 | A1* | 12/2009 | Kono | H04L 12/4641 370/395.53 |
| 2010/0110894 | A1* | 5/2010 | Smith | H04L 12/2697 370/241 |
| 2010/0121946 | A1* | 5/2010 | Claes | H04L 12/5692 709/223 |
| 2011/0029645 | A1* | 2/2011 | Baykal | H04L 29/12264 709/221 |
| 2011/0030032 | A1* | 2/2011 | Baykal | H04L 29/12264 726/3 |

FOREIGN PATENT DOCUMENTS

| | | |
|---|---|---|
| CN | 101075962 A | 11/2007 |
| WO | WO 2004/042999 A1 | 5/2004 |

OTHER PUBLICATIONS

Supplementary European Search Report dated Feb. 8, 2013 in connection with European Patent Application No. EP 10 85 2672.
Chinese Search Report dated Oct. 28, 2012 in connection with Chinese Patent Application No. 2010800035532.
"Virtual Bridged Local Area Networks—Revision", IEEE P802.1Q-REV/D5.0, Sep. 12, 2005, 300 pages.
International Search Report dated Mar. 17, 2011 in connection with International Patent Application No. PCT/CN2010/073594.

* cited by examiner

SERVICE CONFIGURATION METHOD, DEVICE AND SYSTEM

CROSS-REFERENCE TO RELATED APPLICATIONS

This application is a continuation of International Application No. PCT/CN2010/073594, filed on Jun. 7, 2010, which is hereby incorporated by reference in its entirety.

TECHNICAL FIELD

The present invention relates to the field of communications, and in particular, to a service configuration method, device and system.

BACKGROUND

A trend of deploying a device at a user side is presented in an access network currently, the device deployed at a user terminal performs networking with a device of a central office through various technologies, and a technology adopted in the industry is the Ethernet technology. A virtual local area network technology is defined in the IEEE802.1Q standard, and a physical network is divided into multiple virtual local area networks to limit packet broadcasting and differentiate service bandwidth. When a new device is deployed, it is needed to configure VLAN (Virtual Local Area Network, virtual local area network) identifiers carried by different service packets of the device, so that the different service packets are correctly forwarded to corresponding virtual local area networks. For example, a DSLAM (Digital Subscriber Line Access Multiplexer, digital subscriber line access multiplexer) device providing an Ethernet uplink, also provides a management service of remote access in addition to providing an xDSL (x Digital Subscriber Line, digital subscriber line) broadband service, therefore, it is needed to configure uplink VLAN identifiers of the two types of services for deployment of this device, and it is needed to configure an IP address of an interface according to the specific service.

Therefore, at least the following configuration needs to be made for deployment of one device:

1. an IP address of a management interface of the device;
2. a VLAN identifier carried by a service; and
3. configuration of the specific service.

An approach for deploying a new device is provided by the existing DHCP (Dynamic Host Configuration Protocol, dynamic host configuration protocol), and the DHCP technology is implemented in a mode of interaction between a server and a client. A DHCP server is installed in a network, and a newly deployed device serves as a client. The client broadcasts a DHCP request message automatically after accessing the network. After receiving the request message, the DHCP server sends information such as IP to the client according to a set rule, and the client completes its own configuration by using the information. An interaction process between the client and the DHCP server is shown in FIG. 1, where client 3 is the newly deployed client.

However, for a network that is divided into virtual local area networks, because a virtual local area network isolates a broadcast domain of a broadcast packet, the newly deployed client does not know a virtual local area network in which the DHCP server is located, and cannot obtain IP information of a management interface from the DHCP server, thereby causing a application limitation of the DHCP technology in a virtual local area network environment.

SUMMARY

An embodiment of the present invention provides a local area network system, including a DHCP server, an intermediate device and a client, where the client is connected to the DHCP server through the intermediate device, the DHCP server is configured to configure a VLAN ID of a port on the intermediate device according to preset configuration information, where the port is connected to the client; and when a DHCP request message which carries the VLAN ID and is from the intermediate device is received, obtain a MAC (Media Access Control, media access control) address in the DHCP request message, obtain an IP address corresponding to the MAC address from the configuration information, and send a response message to the intermediate device, where the response message carries the IP address and the VLAN ID;

the intermediate device is configured to send the DHCP request message to the DHCP server, where the DHCP request message is from the client; and send the response message to the client; and the client is configured to, after receiving the response message, set a local virtual local area network identifier to the VLAN ID and set a local IP address to the IP address.

An embodiment of the present invention provides a service configuration method in a local area network, the local area network includes a DHCP server, an intermediate device and a client, the client is connected to the DHCP server through the intermediate device, and the method includes steps as follows:

configuring a VLAN ID of a port on the intermediate device according to configuration information, where the port is connected to the client;

after receiving a DHCP request message through the intermediate device from the client, obtaining a MAC address in the DHCP request message, and obtaining an IP address corresponding to the MAC address from the configuration information; and sending, to the client and through the intermediate device, a response message carrying the IP address and the VLAN ID, so that the client sets a local virtual local area network identifier to the VLAN ID and sets a local IP address to the IP address after receiving the response message.

An embodiment of the present invention provides a DHCP server, where the DHCP server is configured to be connected to a client device through an intermediate device, and includes:

a setting unit, configured to configure a VLAN ID of a port on the intermediate device according to preset configuration information, where the port is connected to the client;

a receiving unit, configured to receive a DHCP request message from the intermediate device, where the DHCP request message carries the VLAN ID; and a processing unit, configured to obtain a MAC address in the DHCP request message, obtain an IP address corresponding to the MAC address from the configuration information, and send, to the client and through the intermediate device, a response message carrying the IP address and the VLAN ID, so that the client sets a local virtual local area network identifier to the VLAN ID and sets a local IP address to the IP address.

In the embodiments of the present invention, a VLAN of a port on an intermediate device is configured, so that a newly deployed client can complete configuration of a management channel automatically, thereby implementing the plug-and-play of the device; in addition, the standard DHCP protocol is used during a process of establishing the management channel, so that adaptability is strong.

BRIEF DESCRIPTION OF THE DRAWINGS

To illustrate technical solutions in embodiments of the present invention or in the prior art more clearly, accompanying drawings required for describing the embodiments or the prior art are introduced briefly in the following. Apparently, the accompanying drawings in the following descriptions merely show some embodiments of the present invention, and persons of ordinary skill in the art can derive other drawings from the accompanying drawings without creative efforts.

DETAILED DESCRIPTION

Technical solutions in embodiments of the present invention are described clearly and completely in the following with reference to accompanying drawings in the embodiments of the present invention. Apparently, the described embodiments are merely part rather than all of the embodiments of the present invention. All other embodiments obtained by persons of ordinary skill in the art based on the embodiments of the present invention without creative efforts shall fall within the protection scope of the present invention.

Figure 1:
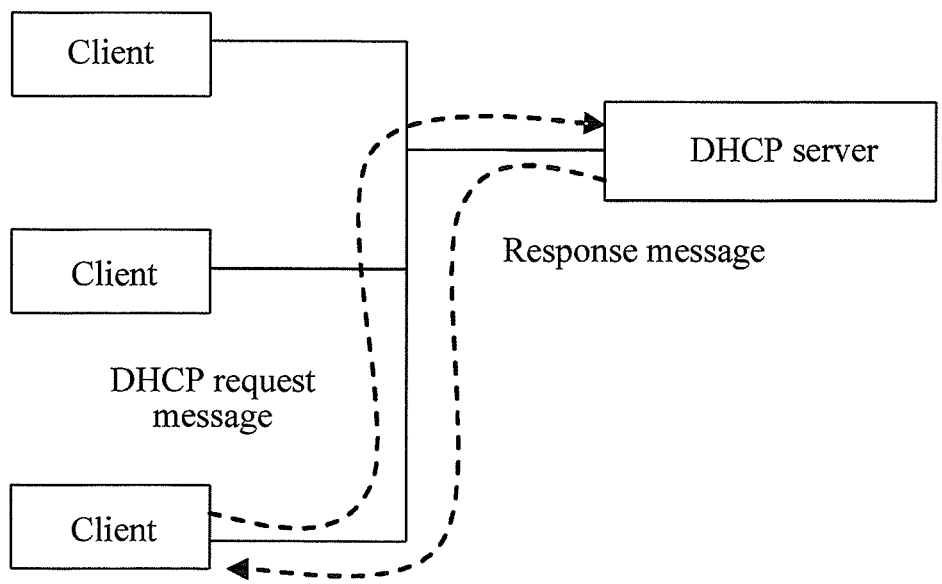
FIG. 1 to FIG. 5 are networking architecture diagrams of a local area network.
Figure 2:
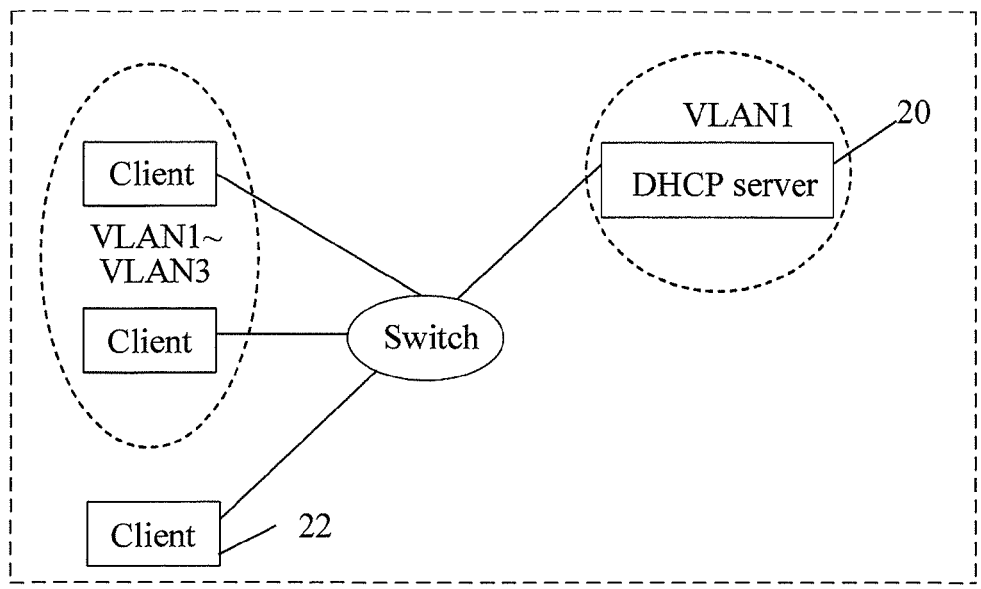
Figure 3:
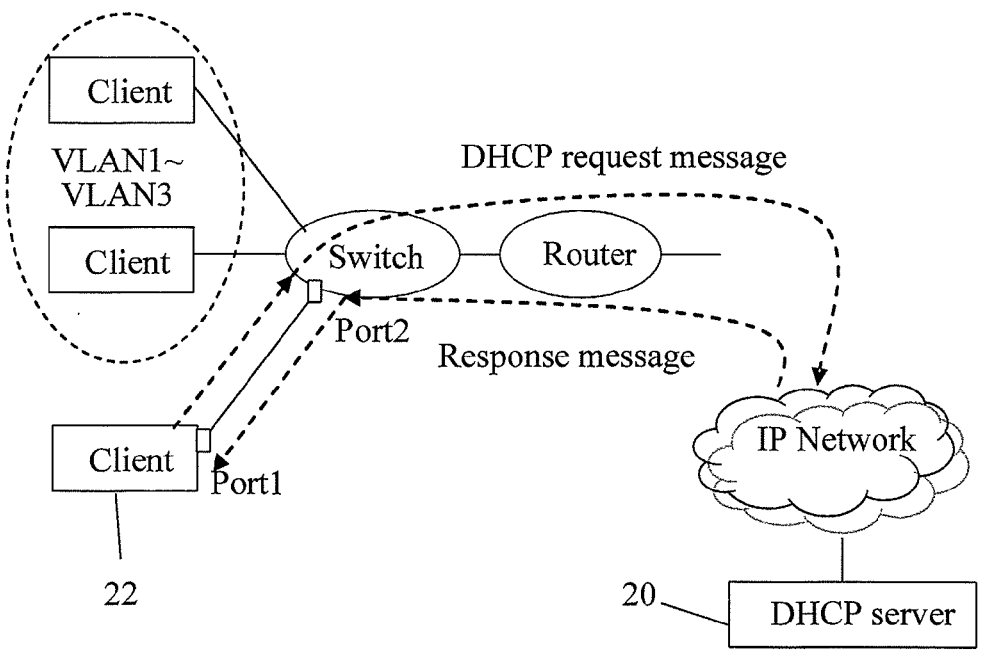

For a local area network shown in FIG. 2 or FIG. 3, a physical network is divided into three (only for example, also may be 1 or multiple) virtual local area networks, VLAN1 to VLAN3. It is assumed that VLAN1 is a management virtual local area network, VLAN2 is a broadband virtual local area network, and VLAN3 is a voice virtual local area network. A DHCP server 20 for assigning a device management interface IP address is deployed in the virtual local area network which is VLAN1, because the virtual local area network isolates a broadcast domain of a broadcast packet, a newly deployed client 22 can obtain management interface IP information from the DHCP server 20 only by sending a DHCP request packet to a broadcast domain of VLAN1, and the client 22 does not know a VLAN in which the DHCP 20 is located, which makes it very hard to normally perform a service of the virtual local area network.

Figure 4:
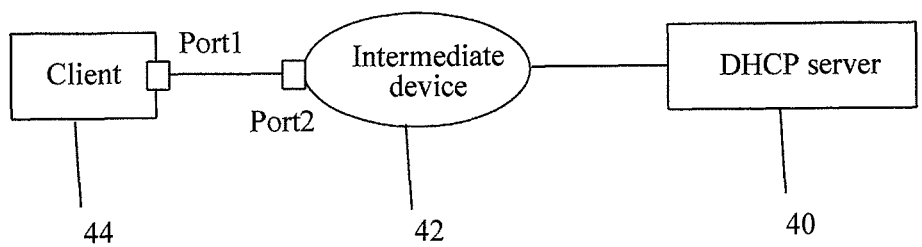

To solve the foregoing problem, an embodiment of the present invention provides a local area network system, as shown in FIG. 4, including a DHCP server 40, an intermediate device 42 and a client 44, where the client 44 is connected through a port (port1, port2) on the intermediate device 42, and the intermediate device 42 in this embodiment may be a switch (Switch) and so on.

The DHCP server 40 is configured to configure a virtual local area network identifier VLAN ID of the port on the intermediate device 42 according to preset configuration information, where the port is connected to the client 44; when a DHCP request message which carries the VLAN ID and is from the intermediate device 42 is received, obtain a MAC (Media Access Control, media access control) address in the DHCP request message, and obtain an IP address corresponding to the MAC address from the configuration information; and send a response message to the intermediate device 42, where the response message carries the IP address and the VLAN ID.

If a DHCP relay (Relay) is not pre-set by port2 on the intermediate device 42, the DHCP server 40 further needs to set the DHCP Relay of port2 through an existing management channel between the DHCP server 40 and the intermediate device 42, for example, the DHCP Relay of port2 is configured to a manner of Option60, so that after port2 receives the DHCP request message from the client 44, the DHCP request message is sent to the DHCP server 40 according to an Option60 option in the DHCP request message.

The intermediate device 42 is configured to send the DHCP request message to the DHCP server 40, where the DHCP request message is from the client 44, receive the response message of the DHCP server 40, and send the response message to the client 44.

The client 44 is configured to, after receiving the response message, set a local virtual local area network identifier to the VLAN ID and set a local IP address to the IP address.

The configuration information may be saved in the DHCP server 40, and may include a VLAN ID of the client 44, an IP address of the client 44 and a MAC address of the client 44. The MAC address of the client 44 may not be planned in the configuration information, and after the MAC address is obtained from the DHCP request message of the client 44, an IP address is assigned to the MAC address according to a preset rule.

Figure 5:
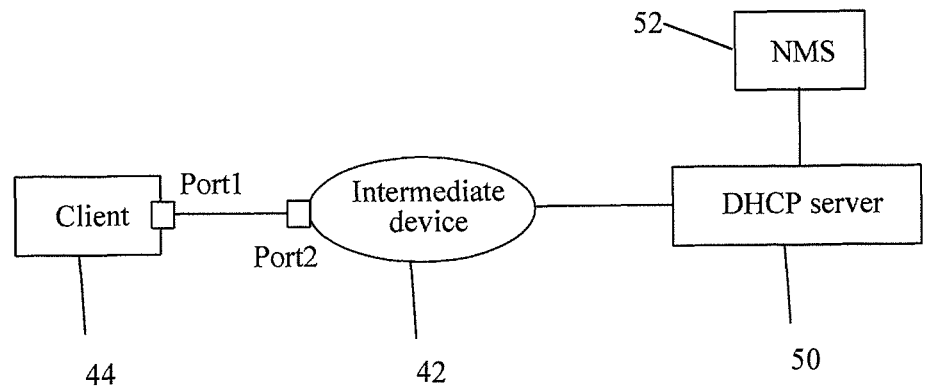

The system provided in this embodiment may further include an NMS (Network Management System, network management system), and as shown in FIG. 5, the NMS 52 may be connected to a DHCP server 50. An NMS user saves configuration information of the client, and content of the configuration information has been discussed above. In this way, after receiving the DHCP request message sent by the client 44, the DHCP server 50 searches in the NMS 52 for a corresponding IP address according to the MAC address in the DHCP request message, constructs a response message containing the IP address, and sends the response message to the client 44 through the intermediate device 42.

The NMS 52 may further upgrade the client 44 and perform service configuration and so on through an established management channel.

The NMS 52 may also configure, according to the preset configuration information, the virtual local area network identifier VLAN ID of the port which is on the intermediate device 42 and connected to the client 44, and may configure port2 on the intermediate device 42 through an existing management channel between the DHCP server 40 and the intermediate device 42.

In the system provided in the embodiment, the DHCP server configures the VLAN ID of the intermediate device, and in this way, after a client is newly deployed, configuration of a management channel may be completed automatically and specific service configuration may be executed, thereby implementing the plug-and-play of the device. In addition, because the system provided in the embodiment uses the standard DHCP protocol, the system is still adaptive in a case of mixed device networking.

An embodiment of the present invention provides a service configuration method in a local area network, the provided method may be used in architecture described in FIG. 4 or FIG. 5, and certainly, the method provided by the embodiment is not limited to the two types of architecture.

Figure 6:
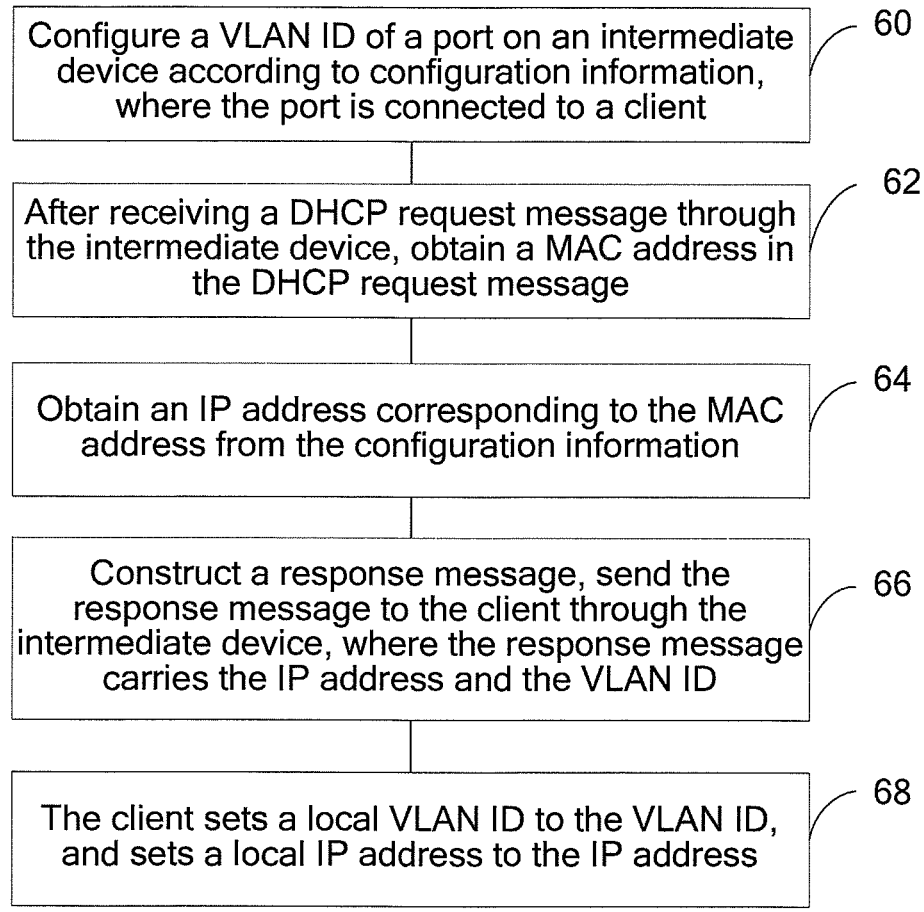
FIG. 6 is a flowchart of a method according to an embodiment of the present invention.

As shown in FIG. 6, the provided method includes:

Step 60: Configure a VLAN ID of a port on an intermediate device according to configuration information, where the port is connected to a client.

The configuration information may be planned in advance, may include a management VLAN ID, an IP address and so on, and may further include configuration data of a specific service, and so on.

According to the planned configuration information, a DHCP server or an NMS knows that a new device will be deployed under port2 of the intermediate device 42, and therefore, configures a default VLAN of port2 to a VLAN identifier of a management local area network through an existing management channel between the DHCP server or the NMS and the intermediate device 42, and the management local area network is VLAN1 in this embodiment.

The DHCP server or the NMS may further configure a DHCP Relay of the intermediate device 42, for example, the DHCP Relay of the intermediate device 42 is configured to a manner of adopting Option 60 and so on, so that the intermediate device 42 forwards a received DHCP request to the DHCP server.

A DHCP Relay of port2 on the intermediate device 42 may also be deployed in advance.

Step 62: After receiving a DHCP request message through the intermediate device, obtain a MAC address in the DHCP request message.

After a new client 44 is deployed under port2, the client 44 sends a DHCP request message automatically after being powered on. The DHCP request message sent by the client 44 may be sent out from an uplink port (port1) in an untag manner, the DHCP request message sent by the client 44 carries a MAC address of the client 44, and may further carry information such as an Option field, for example, Option60 and so on.

The intermediate device 42 puts the default VLAN identifier VLAN1 of port2 in the DHCP request message after receiving the DHCP request message of the client 44, forwards the DHCP request to the DHCP server 40 according to DHCP Relay configuration, and specifically may forward the DHCP request message to the DHCP server 40 according to an Option60 option in the DHCP request message.

Step 64: Obtain an IP address corresponding to the MAC address from the configuration information.

After the DHCP server 40 receives the DHCP request, the DHCP server 40 obtains the MAC address in the DHCP request message, obtains the IP address corresponding to the MAC address according to the MAC address if configuration information of the client 44 is saved in the DHCP server 40 itself; and if the configuration information of the client is saved in the NMS connected to the DHCP server 40, communicates with the NMS, and obtains the IP address corresponding to the MAC address.

If correspondence between a MAC address and an IP address of the client is not planned in the configuration information in advance, the DHCP server 40, after receiving the MAC address, obtains an IP address from an IP address pool and assigns the IP address to the MAC address.

Step 66: Construct a response message, and send the response message to the client through the intermediate device, where the response message carries the IP address and the VLAN ID.

The response message constructed by the DHCP server 40 contains the IP address assigned to the client 44, and further includes the VLAN of the management local area network, which is VLAN1 in this embodiment.

Step 68: The client sets a local VLAN ID to the VLAN ID, and sets a local IP address to the IP address.

After the client 44 receives the DHCP response, the client 44 obtains the IP address and the VLAN ID in the response message, configures the IP address as a management interface IP (layer 3 interface IP) of the client 44 itself, and configures a default VLAN of port1 to VLAN1.

After the foregoing steps, the client 44 has completed configuration of a management channel, the DHCP server or the NMS may access the client 44 remotely, and may also modify the default VLAN of port1 or port2, and may also upgrade the client 44, deliver configuration data and complete configuration of a service such as broadband and voice.

The client in the embodiment sends the DHCP request in the untag manner, where the VLAN identifier of the management virtual local area network is put in the request packet by the port on the intermediate device; make the DHCP Relay; and configure its own in-band management VLAN after obtaining the response message, where a packet that is sent out at this time carries an in-band management VLAN identifier. The default VLAN of the port on the intermediate device is the in-band management VLAN identifier, which causes the VLAN ID to be stripped off from the packet after the packet enters the port of the intermediate device, so that the packet cannot be forwarded to the network management or DHCP server. In the embodiment of the present invention, a default VLAN of the uplink port of the newly deployed client is also configured to a management VLAN, and in this way, a VLAN is stripped off when a management packet is on the uplink port of the client, and the management VLAN may be put in the management packet after the management packet enters the port of the intermediate device.

In this embodiment, after the configuration of the management channel is completed, the default VLAN of port2 of the intermediate device may also be recovered to initial configuration, in this way, the VLAN of the management packet sent by the client will not be stripped off by the intermediate device. However, the configuration might fail after the client receives the response message, this failure will not be sensed by other devices, and therefore, if the default VLAN of port2 of the intermediate device is recovered to an initial value in a case of a failure, a consequence that a DHCP request message subsequently re-initiated by the client is discarded will be caused. In a case that the configuration is successful, successful deployment of the client can also be ensured, and therefore, the method may be used as a candidate solution.

The default VLAN of port2 of the intermediate device may also be configured to a non-management VLAN, and configuring the default VLAN to another VLAN has the following disadvantages: configuring the default VLAN into another VLAN needs to occupy one more VLAN, and one more IP is occupied during the configuration of the DHCP Relay, and such situation does not arise when the management VLAN is used, that is because the IP address of the DHCP Relay configured by the intermediate device is the IP address of the intermediate device, and the route between this IP and the DHCP server or the NMS has been established, so the configuration complex is greatly reduced by configuring the default VLAN of the port into the management VLAN.

Figure 7:
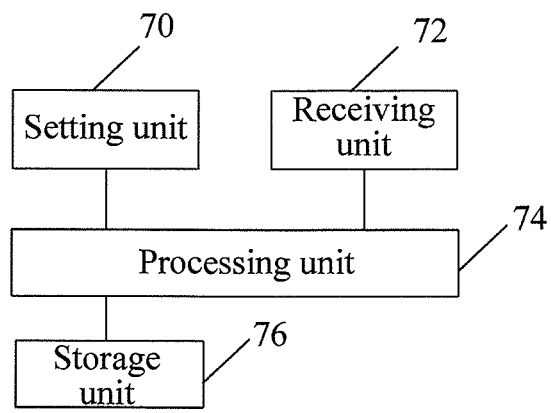
FIG. 7 is a schematic structural diagram of an apparatus according to an embodiment of the present invention.

An embodiment of the present invention provides a DHCP server, the provided DHCP server may be connected to a client through an intermediate device, the intermediate device herein may be an intermediate device such as a switch, and as shown in FIG. 7, the provided DHCP server includes:

a setting unit 70, configured to configure a virtual local area network identifier VLAN ID of a port on the intermediate device according to preset configuration information, where the port is connected to the client; where the setting unit 70 is further configured to configure a DHCP Relay of the port through an existing management channel between the setting unit 70 and the intermediate device, for example, configure the DHCP Relay to a manner of adopting Option60, and so on.

a receiving unit 72, configured to receive a DHCP request message from the intermediate device, where the DHCP request message carries the VLAN ID; and a processing unit 74, configured to obtain a media access control MAC address in the DHCP request message, obtain an IP address corresponding to the MAC address from the configuration information, and send, to the client and through the intermediate device, a response message carrying the IP address and the VLAN ID, so that the client sets a local virtual local area network identifier to the VLAN ID and set a local IP address to the IP address.

The processing unit 74 is further configured to assign an IP address to the MAC address.

The provided DHCP server may further include a storage unit 76, which is configured to store the configuration information, where content of the configuration information has been described in the foregoing embodiments.

If the configuration information is stored in an NMS connected to the DHCP server, the processing unit 74 is further configured to obtain an IP address corresponding to the MAC address from the NMS.

The DHCP server provided by the embodiment of the present invention configures the VLAN of the port on the intermediate device, so that a newly deployed client can complete configuration of a management channel automatically, thereby implementing the plug-and-play of the device; in addition, the standard DHCP protocol is used during a process of establishing the management channel, so that adaptability is strong.

Persons of ordinary skill in the art can understand that all or part of the steps of the methods in the foregoing embodiments may be completed by a program instructing relevant hardware. The program may be stored in a computer readable storage medium, such as a ROM/RAM, a magnetic disk, or an optical disk.

What is described above are only specific implementation manners of the present invention and is not intended to limit the protection scope of the present invention. Any modification or replacement that can be easily derived by persons skilled in the art within the technical scope disclosed in the present invention shall fall within the protection scope of the present invention. Therefore, the protection scope of the present invention is subject to the appended claims.

What is claimed is:

1. A local area network system, comprising:
a dynamic host configuration protocol (DHCP) server, an intermediate device and a client, wherein the client is connected to the DHCP server through the intermediate device;
the DHCP server is configured to configure a virtual local area network identifier (VLAN ID) of a port on the intermediate device according to preset configuration information, wherein the port is connected to the client, receive a DHCP request message from the intermediate device, wherein the DHCP request message carries the VLAN ID, obtain a media access control (MAC) address from the DHCP request message, obtain an IP address corresponding to the MAC address from the configuration information, and send a response message to the intermediate device, wherein the response message carries the IP address and the VLAN ID;
the intermediate device is configured to modify the DHCP request message by including the VLAN ID and send the modified DHCP request message to the DHCP server, wherein the DHCP request message is from the client; and send the response message to the client; and
the client is configured to send the DHCP request message to the port on the intermediate device, receive the response message, set a local virtual local area network identifier to the VLAN ID and set a local IP address to the IP address.

2. The system according to claim 1, wherein the DHCP server is further configured to configure a DHCP relay of the port through an existing management channel between the DHCP server and the intermediate device.

3. The system according to claim 1, wherein the configuration information comprises a VLAN ID, an IP address and a MAC address of the client.

4. The system according to claim 1, wherein the configuration information comprises a VLAN ID of the client and an IP address of the client, and
the DHCP server is further configured to assign an IP address to the MAC address according to a preset rule after obtaining the MAC address.

5. The system according to claim 2, wherein the configuration information comprises a VLAN ID of the client and an IP address of the client, and
the DHCP server is further configured to assign an IP address to the MAC address according to a preset rule after obtaining the MAC address.

6. The system according to claim 1, wherein the system further comprises a network management system (NMS) connected to the DHCP server, wherein the NMS is configured to save the configuration information.

7. A service configuration method in a local area network, wherein the local area network comprises a dynamic host configuration protocol (DHCP) server, an intermediate device and a client, the client is connected to the DHCP server through the intermediate device, and the method comprises:
configuring a virtual local area network identifier (VLAN ID) of a port on the intermediate device according to configuration information, wherein the port is connected to the client;
receiving a DHCP request message through the intermediate device from the client, the DHCP request message including the VLAN ID;
obtaining a media access control (MAC) address in the DHCP request message;
obtaining an IP address corresponding to the MAC address from the configuration information; and
sending, to the client, a response message carrying the IP address and the VLAN ID, so that the client sets a local virtual local area network identifier to the VLAN ID and sets a local IP address to the IP address after receiving the response message.

8. The method according to claim 7, wherein the method further comprises configuring a DHCP relay of the port through an existing management channel between the DHCP server and the intermediate device.

9. The method according to claim 6, wherein the configuration information comprises a VLAN ID, an IP address and a MAC address of the client.

10. A dynamic host configuration protocol (DHCP) server, configured to be connected to a client device through an intermediate device, the DHCP server comprising:
- at least one processor;
- a setting unit implemented by the at least one processor, configured to configure a virtual local area network identifier (VLAN ID) of a port on the intermediate device according to preset configuration information, wherein the port is connected to the client;
- a receiving unit implemented by the at least one processor, configured to receive a DHCP request message from the intermediate device, wherein the DHCP request message carries the VLAN ID; and
- a processing unit implemented by the at least one processor, configured to obtain a media access control (MAC) address in the DHCP request message, obtain an IP address corresponding to the MAC address from the configuration information, and send, to the client and through the intermediate device, a response message carrying the IP address and the VLAN ID, so that the client sets a local virtual local area network identifier to the VLAN ID and sets a local IP address to the IP address.

11. The server according to claim 10, wherein the processing unit is further configured to assign an IP address to the MAC address.

\* \* \* \* \*